United States Patent [19]

Wheatley

[11] Patent Number: 5,631,769

[45] Date of Patent: May 20, 1997

[54] HIGH POWER LASER AMPLIFIER

[75] Inventor: David I. Wheatley, Dundee, United Kingdom

[73] Assignee: Moore Limited, Westerly, R.I.

[21] Appl. No.: 545,599

[22] PCT Filed: Apr. 28, 1995

[86] PCT No.: PCT/GB94/00914

§ 371 Date: Dec. 19, 1995

§ 102(e) Date: Dec. 19, 1995

[87] PCT Pub. No.: WO94/26009

PCT Pub. Date: Nov. 10, 1994

[30] Foreign Application Priority Data

Apr. 28, 1993 [GB] United Kingdom ............... 9309006

[51] Int. Cl.⁶ .................................................. H01S 3/23
[52] U.S. Cl. .......................... 359/337; 359/341; 359/345; 359/349
[58] Field of Search ............................ 359/337, 341, 359/345, 349

[56] References Cited

U.S. PATENT DOCUMENTS

| | | | |
|---|---|---|---|
| 3,646,468 | 2/1972 | Buczek et al. | 359/337 |
| 5,278,686 | 1/1994 | Grasso et al. | 359/341 |
| 5,295,015 | 3/1994 | Yoneyama | 359/333 |
| 5,315,674 | 5/1994 | Asako | 359/179 |
| 5,355,250 | 10/1994 | Grasso et al. | 359/337 |
| 5,406,411 | 4/1995 | Button et al. | 359/341 |
| 5,455,710 | 10/1995 | Takeda | 359/337 |
| 5,475,521 | 12/1995 | Heidemann | 359/177 |
| 5,521,752 | 5/1996 | Heidemann et al. | 359/341 |

FOREIGN PATENT DOCUMENTS

| | | |
|---|---|---|
| 2412185 | 5/1975 | France . |
| 2247835 | 7/1979 | France . |
| 1948344 | 4/1970 | Germany . |

*Primary Examiner*—Nelson Moskowitz
*Attorney, Agent, or Firm*—Sughrue, Mion, Zinn, Macpeak & Seas

[57] ABSTRACT

The present invention relates to a laser amplification system (1). The system (1) is constituted by a laser light source (2) for providing a main laser beam (LB); a laser light amplifier (3) for amplifying the main laser beam (LB) and apparatus for supplying a bleed laser beam (BO) to the laser radiation amplifier (3). The bleed laser beam (BO) is amplified by the laser radiation amplifier (3) at least when the main laser beam (LB) has a low or zero power valve substantially to prevent super-radiance.

22 Claims, 1 Drawing Sheet

HIGH POWER LASER AMPLIFIER

FIELD OF THE INVENTION

The present invention relates to laser amplifiers, and in particular, laser systems in which an oscillator output is subjected to high amplification.

BACKGROUND OF THE INVENTION

The oscillator-amplifier configuration is a known alternative to the plain oscillator in the design of laser sources. In general, it is neither as efficient nor as straightforward as the plain oscillator configuration. It can however, offer a significant advantage where a low power laser source already exists; or where a low power oscillator offers desirable features of quality or control not easily obtainable within a high power oscillator.

A particular problem that arises with such systems is that with high enough overall gain, the amplifier can exhibit super-radiance i.e. can generate output power when no input signal is present. This power can be a significant fraction of the amplifier's maximum output. Furthermore, it will emerge from both the input and output ends of the amplifier. It is therefore essential that super-radiance should be controlled or removed in a practical high power amplifier.

SUMMARY OF THE INVENTION

It is an object of the present invention to avoid or minimize one or more of the above disadvantages and problems of previously known systems.

It has now been found that super-radiance can be controlled by introducing a second input laser beam into the high power amplifier, to bleed off power from the amplifier to reduce or eliminate any tendency for the amplifier to super-radiate and "convert" it into a more or less controllable form.

The present invention provides a laser amplification system comprising a laser radiation source for providing a main laser beam, a laser radiation amplifier for amplifying said main beam, and means for supplying a bleed laser beam to the laser radiation amplifier for amplification thereby at least when the main laser beam has a low or zero power value substantially to prevent super-radiance.

The present invention also provides a high power laser amplifier system having an oscillator and an amplifier for amplifying a main laser beam input originating from said oscillator, wherein there is provided a bleed laser beam generator means for supplying a bleed laser beam input to said amplifier during operation of the amplifier, at least when the main laser beam input has a low or zero power value, whereby in use of said laser amplifier system with small or zero main laser beam inputs, said bleed laser beam input extracts sufficient power from said amplifier substantially to prevent super-radiance.

Thus with a system of the present invention super-radiance in a high power laser amplifier may be substantially avoided in a simple and effective manner by inputting the bleed beam into the amplifier so as to be amplified thereby and produce an amplified bleed beam which can be suitably diverted or otherwise controlled—unlike super-radiance,—thereby allowing, inter alia, effective amplification of low power (main) laser beam inputs without the risk of producing potentially damaging output radiation resulting from super-radiance.

Whilst the laser beam source(s) will usually comprise an oscillator(s), other sources could in principle also be used e.g. a super-fluorescent source. It will also be understood that the invention may be used with various different laser systems producing laser beams within or outside the visible spectrum, including $CO_2$ and YAG laser systems.

The present invention is also applicable to laser amplifiers having a wide range of power outputs but is particularly beneficial in relation to higher power amplifiers wherein super-radiance is a particular problem. The degree of the problem will depend on various factors such the particular application for which the laser is being used e.g. the particular material being cut by the laser beam and the sensitivity of the material to damage from a super-radiant laser beam; and the lasing medium. In general, particularly in the case of $CO_2$ lasers, the laser amplification system of the invention preferably has a normal fully working output of at least 500 w, most preferably at least 700 w.

Various forms of bleed laser beam input may be utilized in the system of the present invention. Thus the bleed laser beam may be obtained from a separate source or, conveniently, from the oscillator used to generate the main laser beam. The bleed laser beam may be fed into the amplifier from the same direction or end as the main laser beam though preferably it is fed in from a different or opposite direction or end, as that has the advantage of avoiding the risk of any output power in the pathway of the amplified main laser beam when the main beam input is zero.

In order to maximize the useful operating range of the system, especially in relation to lower values of the main laser beam input, the amplified bleed beam and amplified main beam, and the bleed beam and main beam are desirably separated, by any suitable means, such as for example by being given different polarizations, conveniently mutually orthogonal, whereby the main and bleed beams may be 'combined' upstream and 'separated' downstream of the amplifier, from and to separate pathways, by means of suitable optical devices such as Brewster windows, as further explained hereinbelow.

We have further found that at high amplifier output powers, the output power is a relatively weak function of the input power. Accordingly the bleed beam input power required to overcome super-radiance can be relatively small compared with the main input power used to give maximum power extraction. It is thus feasible for a constant bleed beam power to be used which overcomes super-radiance when the main input is small or zero, but which only reduces the maximum output power by a small percentage. Nevertheless even more effective operation can be obtained by reducing the bleed beam power as the main beam power is increased.

The bleed beam may have a relatively wide range of power levels provided it is at least sufficient to prevent super-radiance. Relatively high levels do not bring any significant additional benefits but may lead to some loss of efficiency. The minimum power level required to prevent super-radiance will depend largely on the gain of the laser amplifier. In general the system is formed and arranged so as to provide a bleed beam having a power level sufficient to provide a combined output beam (i.e. amplified bleed beam output and any amplified main beam output) power level at least from 10 to 50% of the normal full output of the laser amplifier. Thus, for example, with a 1000 w amplifier the bleed beam should be at a level (readily determined by simple trial and error) sufficient to provide an output power level of at least from 100 to 500 w. In a generally typical example of such an amplifier there might be used a bleed beam input of around 1 w when the main beam input is zero, and a similar or lower level (e.g. 1 w to 0.1 w) when a full main beam input of around 20 w is used.

It will also be understood that various forms of laser beam amplifier may be used in accordance with the present invention. Usually these will be externally pumped in one way or another as is well known in the art. In principle though it may also be possible to use an internally pumped laser amplifier.

BRIEF DESCRIPTION OF THE DRAWINGS

Further preferred features and advantages of the invention will appear from the following detailed description, given by way of example, of some preferred embodiments illustrated with reference to the accompanying drawings in which.

DETAILED DESCRIPTION OF THE PREFERRED EMBODIMENTS

Figure 1:
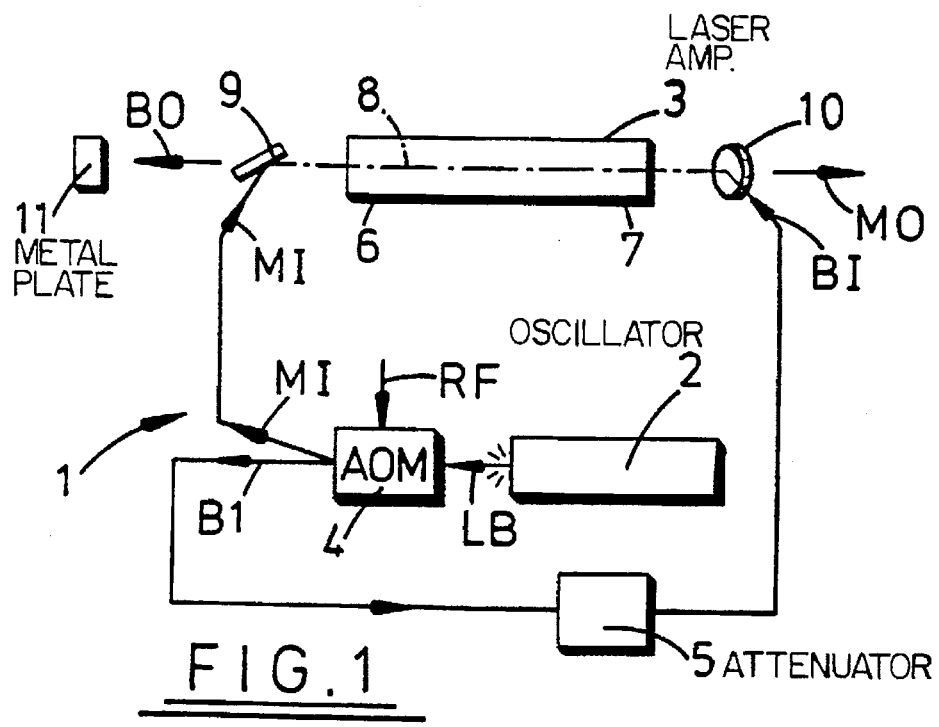
FIG. 1 is a schematic block diagram of a high power laser amplifier system of the present invention.
Figure 2:
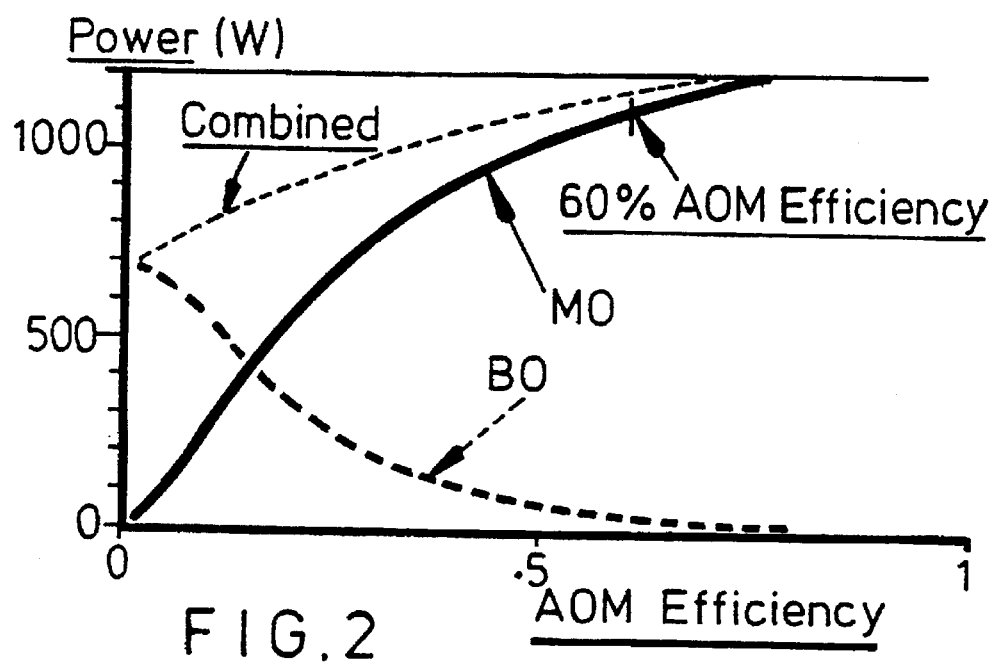
FIG. 2 is a graph showing the variation in power of the amplified main and bleed laser beams.

FIG. 1 shows a high power laser amplifier System 1 comprising an oscillator 2 and laser amplifier 3. The oscillator 2 produces a laser beam LB which is fed to an acousto-optic modulator 4 which is of generally known form and construction and has a 40 MHz variable power radio frequency input RF which changes the proportion of the laser beam deflected from the bleed beam path BI into the main beam path MI. (It will be appreciated that with this arrangement the bleed beam is automatically reduced in power as the main beam power is increased, thereby maximizing effective amplification of the main beam input MI to the main beam output MO as may be seen in FIG. 2 which shows the progressive increase and decrease of the individual main and bleed output beams respectively along with the combined power of the two output beams.)

In order to restrict the power of the bleed beam input BI to the amplifier 3, an attenuator 5 is provided in the path of the bleed beam input BI. Various suitable forms of attenuator may be employed e.g. a partially transmissive (e.g. 3%) window.

As shown in FIG. 1 the main and bleed beam inputs are routed along two different paths MI, BI (using reflectors and/or other suitable optical elements—not shown) to opposite ends 6, 7 of the amplifier 3. The main and bleed beam inputs obtained from the modulator 4 are made to be mutually orthogonally polarized and are reflected into the main axis 8 of the amplifier 3 via respective Brewster windows 9, 10 so that each of the main and bleed beams passes through the amplifier to be amplified therein and the resulting output beam MO, BO is then transmitted through the other one of said Brewster windows 10, 9.

It will be understood that if part of either output beam BO, MO were instead to be reflected by the respective Brewster window 9, 10, then it would be routed back into the modulator 4 and oscillator 2. In order to avoid this as far as possible, the Brewster windows 9, 10 and other parts of the system are formed and arranged to minimize any such "mis-routeing" of the output beams.

The amplified bleed beam BO will normally simply be dumped e.g. to a suitable metal plate 11. If preferred though it could also be utilized.

It will be understood that the amplifier in particular, is only indicated schematically in the drawings and various forms of amplifier may be used including multi-fold laser amplifiers such as those described in our earlier U.K. Patent No. 2192483. With such multiple-fold amplifiers where the laser beam axis has a number of legs extending between successive reflectors it has been found that the bleed beam does not need to be routed through all of the legs of the amplifier. Typically, as discussed in U.K. Patent No. 2192483, in carbon dioxide gas laser amplifiers of the transverse excitation type which are externally pumped by way of an electronic discharge which inverses the populations of the vibration-rotation levels of the carbon dioxide gas molecules before the passage of the light beam to be amplified.

Where an AOM-type Modulator is used, it should be borne in mind that these produce a frequency shift. Accordingly there would preferably be used two AOM-type modulators formed and arranged to provide equal and opposite frequency shifts thereby to cancel out this effect. As an alternative to an AOM there could be used an electro-optic modulator EOM. The use of such modulators is known in the art from standard textbooks such as "Quantum Electronics" by Annon Yariv, published by John Wiley & Sons.

Advantageously the oscillator is provided with stabilization means to compensate for variations in the effective length of the main axis for the laser beam generated therein due to thermal expansion of the oscillator e.g. by using a piezo-electric displacement device formed and arranged for displacing one or both of the end reflectors back towards the other along the main axis as required to compensate for the thermal expansion of the oscillator.

Figure 3:
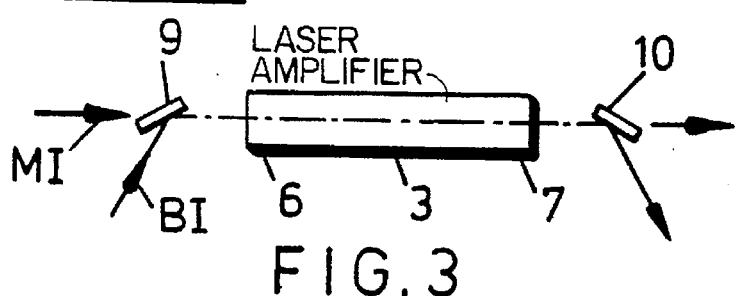
FIG. 3 is a schematic detail diagram showing a modified pathway arrangement for the bleed and main beams.

FIG. 3 is a detail view of a modified system of the invention in which both the bleed and main beams are routed through the amplifier in the same direction i.e. both entering at the same end 6 and exiting at the same end 7, with Brewster windows 9, 10 again being used to combine and separate the bleed and main beams.

In addition to the previously mentioned advantages, the first described embodiment allows fast modulation and power ramping of a high power laser. For a $CO_2$ laser, modulation at hundreds of kHz may be achieved—an order of magnitude higher than that obtainable by conventional discharge modulation. The oscillator-amplifier configuration allows the use as control elements of AOMs, capable of transmitting only tens of watts, in a laser device generating an output beam of many hundred of watts in power.

I claim:

1. A laser amplification system comprising a laser light source for providing a main laser beam, a laser light amplifier for amplifying said main beam, and means for supplying a bleed laser beam to the laser radiation amplifier for amplification thereby at least when the main laser beam has a zero power value to reduce super-radiance.

2. A system according to claim 1 which includes laser light beam splitting means for splitting an output beam of the laser light source into said main beam and said bleed beam.

3. A system according to claim 2, wherein the splitting means comprises at least one acousto-optic modulator.

4. A system according to claim 3, wherein the splitting means comprises two acousto-optic modulators coupled in series each being arranged to provide substantially equal and opposite frequency shifts to the laser beams passing therethrough.

5. A system according to claim 2, wherein the splitting means is an electro-optical modulator.

6. A system according to claim 1, wherein the means for supplying the bleed beam comprises a second laser light source.

7. A system according to claim 1 which includes separating means for separating the amplified main beam exiting the amplifier from the amplified bleed beam exiting the amplifier.

8. A system according to claim 7 wherein the separating means is formed and arranged for giving the main beam and the bleed beam different polarisations and wherein said means for separating said amplified main and bleed beams exiting the amplifier, comprises means for separating light exiting from the amplifier in dependence upon its polarisation.

9. A system according to claim 8, wherein said different polarisations are mutually orthogonal.

10. A system according to claim 8, wherein the means for separating light in dependence upon its polarisation comprises a brewster window adjacent the or each exit surface of the amplifier.

11. A system according to claim 1, wherein the main beam and the bleed beam are input into the same end of the amplifier.

12. A system according to claim 1, wherein the main beam and the bleed beam are input into opposite ends of the amplifier.

13. A system according to claim 1 which includes control means formed and arranged for reducing the power in the bleed beam as the power in the main beam is increased and vice versa.

14. A system according to claim 1 which includes laser light beam splitting means for splitting an output beam of the laser light source into said main beam and said bleed beam which includes control means formed and arranged for reducing the power in the bleed beam as the power in the main beam is increased and vice versa, wherein the laser light beam splitting means is formed and arranged so as to provide said control means.

15. A system according to claim 1, wherein the amplifier utilizes an external pumping means.

16. A system according to claim 1 wherein the laser light source comprises an oscillator.

17. A system according to claim 1 wherein the laser amplification system is a high power laser amplification system having a maximum output of at least 500 W.

18. A method of amplifying a main laser beam so as to reduce super-radiance and comprising inputting into a laser light amplifier, in addition to the main beam, a bleed laser beam at least when the main beam has a zero power value.

19. A method according to claim 18 and including the step of splitting a laser beam into said main beam and said bleed beam.

20. A method according to claim 18 which includes the step of applying different polarisations to the main beam and the bleed beam.

21. A method according to claim 18 which includes the step of reducing the power in the bleed beam as the power in the main beam is increased and vice versa.

22. A method according to claim 18 in which amplification of the laser beam is effected by externally pumping the amplifier.

* * * * *

UNITED STATES PATENT AND TRADEMARK OFFICE
CERTIFICATE OF CORRECTION

PATENT NO. : 5,631,769
DATED : May 20, 1997
INVENTOR(S) : Wheatley

It is certified that error appears in the above-identified patent and that said Letters Patent is hereby corrected as shown below:

Title page, item [22] change the date to read-- "Apr. 28, 1994"--.
            item [30] change the date to read-- Apr. 30, 1993--.

Signed and Sealed this

Sixteenth Day of December, 1997

Attest:

BRUCE LEHMAN

*Attesting Officer*    *Commissioner of Patents and Trademarks*